J. M. GOLDSMITH.
COOKING APPARATUS.
No. 180,021.  Patented July 18, 1876.
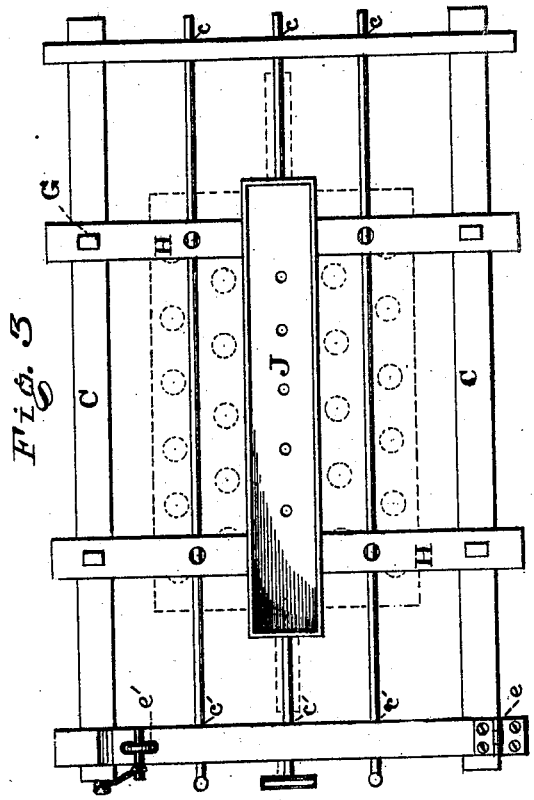
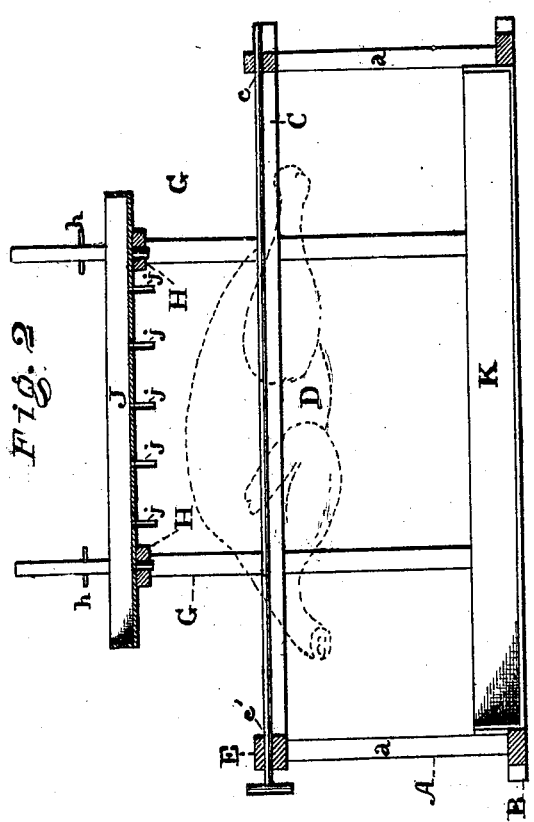
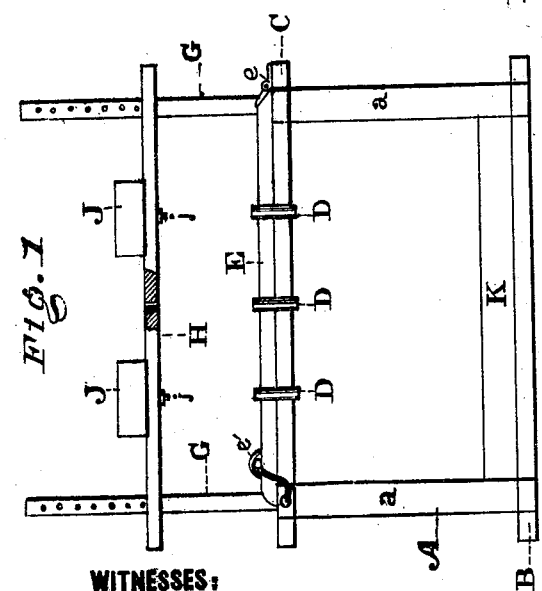
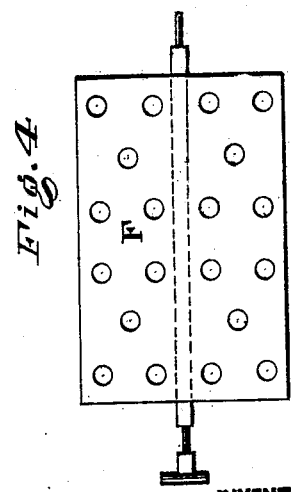
WITNESSES:
Theodore S. West, M.D.
J C Kenon
INVENTOR:
Mrs. Jno. M. Goldsmith
BY
ATTORNEYS.

UNITED STATES PATENT OFFICE.

MRS. JOHN M. GOLDSMITH, OF GREAT MILLS, MARYLAND.

IMPROVEMENT IN COOKING APPARATUS.

Specification forming part of Letters Patent No. 180,021, dated July 18, 1876; application filed June 9, 1876.

*To all whom it may concern:*

Be it known that I, Mrs. JOHN M. GOLDSMITH, of Great Mills, in the county of St. Mary's and State of Maryland, have invented a new and useful Cooking Apparatus; and I do hereby declare the following to be a full, clear, and exact description of the same.

In the drawings accompanying and forming part of this specification, Figure 1 represents a front elevation of my invention. Fig. 2 represents a side elevation. Fig. 3 represents a plan of the same. Fig. 4 is a detail view of a broiler to be used in connection with my invention.

The object of my invention is the construction of a device to be employed in conjunction with a stove, by which device the process of baking, roasting, or other manner of cooking may be much facilitated, and the meat or other food cooked more perfectly and uniformly than is usually the case. My invention consists of a rectangular iron frame-work, composed of a bottom and top frame, joined at their corners by uprights of equal height.

The rear bar of the upper frame is provided with holes, in which pivot the rear ends of certain spits, their front ends forming T-shaped handles, the necks of which lie in grooves on the front bar of the frame, where they are secured, when necessary, by a grooved accessory-bar, hinged at one end, and provided with a slot in the other, to receive a staple fixed to the upper surface of the front bar, over which the accessory-bar is fastened by a pin passing through the staple. One of these spits pivots centrally in the upper frame, and any or all are removable at will, the upper frame serving to receive any contrivance for broiling, frying, or other means of cooking, which is provided with suitable pivots. On each side of the frame-work are two uprights, which project above the top frame, and stand opposite their fellows on the other side. Over these uprights fit two transverse bars by means of slots in their ends, their position being determined by pins fitting into holes in the uprights. These transverse bars are provided with openings over each spit, which openings serve to secure dripping-pans over the material being cooked, by means of projections on the lower surfaces of the pans. The latter rest on the transverse bars, and are provided with small holes in their bottoms, from which holes run small short tubes, for the purpose of causing the gravy with which the pans are filled to fall, drop by drop, upon the food cooking below, beneath which, within the lower frame, rests a large pan to catch the falling gravy, from which it may be returned again to the upper pans, thus basting the cooking meat automatically in part.

In the accompanying drawings, A represents the rectangular iron frame-work, composed of the lower frame B and upper frame C, connected at their corners by the four uprights $a$. The rear bar of the upper frame is provided with holes at $c\ c$, for the accommodation of the pivoting rear ends of the spits D D, which have T-shaped heads with necks, lying in grooves $c'\ c'$ of the front bar of the frame, where they are secured by the accessory-bar E, which has grooves on its under surface, corresponding with the grooves $c'\ c'$ on the upper surface of the front bar. These grooves, in conjunction, form the front bearings of the spits D D. The accessory-bar E is hinged at one end, $e$, to the front bar of the upper frame, and slotted at the other for the passage of the staple $e'$. When desirable, the spits D D may be removed, and any culinary utensil which is adapted to pivot in the holes and grooves of the upper frame may be inserted. F is a broiling utensil fitted for this purpose. (To roast coffee, an ordinary circular roaster is inserted in the frame-work, its shaft, the front end of which may project through a small hole in the stove-door, fitting into the central bearings of the upper frame. G G, on each side of the frame-work, are standards, over which slip the transverse bars H, the position of the latter being controlled by the pins $h\ h$ fitting into holes in the standards. The transverse bars are each provided with an opening, $h'$, over each spit, which openings receive projections on the dripping-pans J, and secure the latter on the bars. The pans J are provided with small holes in their bottoms, from which descend small short tubes $j\ j$, to cause the gravy to fall, drop by drop, upon the food cooking below. Fitting within the lower frame B is the large pan K, which serves to catch the falling gravy, and from which it may be returned again to the upper pans, when desirable, the pans together thus acting, in part, as an automatic roaster. The broiler F is composed of a rectangular perforated plate, having fixed to its lower surface a bar, which pivots in the frame A when the spits D D are removed. A similar bar may be attached to a frying-pan or other cooking utensil, which could then be used in conjunction with the invention.

Having thus described my invention, what I claim as new, and desire to secure by Letters Patent, is—

1. In a cooking apparatus for stoves, the frame A, provided with bearings for spits or other cooking utensils, in combination with the uprights G G, transverse bars H H, and dripping-pans J J, substantially as and for the purpose herein specified.

2. In a cooking apparatus for stoves, the dripping-pans J J, provided with small holes in their bottoms, and combined with the tubes $j\ j$, frame A, and drip-pan K below the material to be cooked, substantially as and for the purpose herein specified.

MRS. JOHN M. GOLDSMITH.

Witnesses:
S. HAMBLETON FREELAND,
DOUGLAS FREELAND.